US005206789A

United States Patent [19]

Barbry

[11] Patent Number: 5,206,789

[45] Date of Patent: Apr. 27, 1993

[54] TERMINAL ASSEMBLY FOR A CIRCUIT BREAKER AND SIMILAR APPARATUS

[75] Inventor: Ernest D. Barbry, Beaver, Pa.

[73] Assignee: Westinghouse Electric Corp., Pittsburgh, Pa.

[21] Appl. No.: 846,101

[22] Filed: Mar. 5, 1992

[51] Int. Cl.$^5$ .............................................. H02B 1/20

[52] U.S. Cl. .................................... 361/355; 200/284; 335/202; 361/353; 361/361; 361/376; 361/426; 439/810; 439/814

[58] Field of Search ..................... 174/73 R, 78, 84 R; 200/280, 281, 284; 335/8, 132, 202; 337/45; 361/346, 347, 350, 353-361, 363, 375, 376, 426; 439/784, 790-792, 810-814

[56] References Cited

U.S. PATENT DOCUMENTS 3,891,298 6/1975 Yorgin et al. .

4,603,376 7/1986 Maier .

5,005,104 4/1991 Grunert et al. .

FOREIGN PATENT DOCUMENTS 600501 6/1960 Canada ............................... 439/814

*Primary Examiner*—Gregory D. Thompson

*Attorney, Agent, or Firm*—Gary R. Jarosik

[57] ABSTRACT

A conductor terminal clamp using a screw to maintain in tight overlapping relation an electric cable and the flat conductor end. The clamp collar is constructed without the use of welds and is provided with a pair of opposing movable finger members. The terminal end is disposed within the collar between the movable finger members which apply a gripping force transversely upon the terminal end as the screw applies the clamping force perpendicularly upon the overlapping collar and conductor end.

28 Claims, 6 Drawing Sheets

TERMINAL ASSEMBLY FOR A CIRCUIT BREAKER AND SIMILAR APPARATUSBACKGROUND OF THE INVENTION

This invention relates in general to conductor terminal clamps, and more particularly to the connection of an electric cable and the bus terminal of a circuit breaker with a terminal clamp.

As disclosed in U.S. Pat. Nos. 3,891,298, 4,603,376, and 5,005,104, all assigned to the assignee of this application, a terminal lug, or collar, having a clamping screw is utilized to maintain a tight, overlapping connection between an electric cable and the flat terminal of a circuit breaker. Variations of these collar designs are constructed from a unitary piece of metal bent into the collar shape and welded closed. An important problem to solve in these collars is maintaining adequate pressure upon the cable with the clamping screw without causing the construction welds of these clamping collars to break. Another important problem to solve with such assemblies is counter-acting any tangential forces developed between the collar and the conductor end which might allow the conductor end to slip free of the clamp collar. This latter problem has been solved to some degree by the inventions of the aforementioned patents. The '298 patent teaches the using of a boss protruding from the collar side which engages an aperture in the terminal end, the '376 patent teaches the using of an additional screw passing through the collar side and the aperture of the terminal end, and the '104 patent teaches the using of a clip having a boss which engages the aperture in the terminal end, the clip being snapped on the collar side. However, in all of these inventions the weld-breaking problem exists. It would be advantageous to solve these problems in a simple, low cost manner without impairing the standard nature of the assembly for different types of circuit breakers, nor the inherent advantage of a straightforward mounting.

SUMMARY OF THE INVENTION

The invention proposes a solution for clamping an electric cable to a bus conductor terminal end in overlapping relation in a clamp collar. The clamp collar is constructed with a locking screw for applying a securing force upon the electric cable which in turn urges the electric cable into contact with the bus terminal and further secures the electric cable within the collar. The collar is further constructed with a pair of movable finger members which are disposed adjacent to the sides of the bus conductor end. These fingers apply a second securing force upon the bus terminal end as the locking screw is turned. The second securing force is generally perpendicular to the direction of the securing force applied by the lock screw. The movement of the finger members further acts to attenuate the mechanical stress the collar undergoes as the locking screw is tightened.

BRIEF DESCRIPTION OF THE DRAWINGS

A full understanding of the invention can be gained from the following description of the preferred embodiment when read in conjunction with the following drawings, in which.

DETAILED DESCRIPTION OF THE DRAWINGS

While the invention can be used for connecting electric lines or power cables to bus conductor terminals of various devices, the invention will be described hereinafter in the context of a circuit breaker as the preferred embodiment thereof.

Turning to FIGS. 1 through 6, the clamp collar 20 is shown. The collar 20 is constructed out of a unitary piece of conducting material such as metal bent into a nearly rectangular cross-sectional shape comprising generally rectangularly shaped sides 22, 24, 26, and 28. The side 28 includes two movable finger support members, or flanges, 40 and 42. The unitary piece of conducting material is clearly shown in FIG. 2 where the bends are applied to the unitary piece of material along the dashed lines creating the sides 22, 24, 26, and 28 of the collar 20. The generally rectangular shape is selected owing to the rectangular shape of the bus conducting terminal over which the collar 20 is to be disposed although other collar shapes may be utilized. The conducting metal was selected to increase the area of electrical contact between the bus conducting terminal and the electric cable while further providing a solid enclosure. It is noted that other materials may be utilized provided they can withstand the mechanical stresses associated with clamping the electric cable to the bus conducting terminal.

Figure 1:
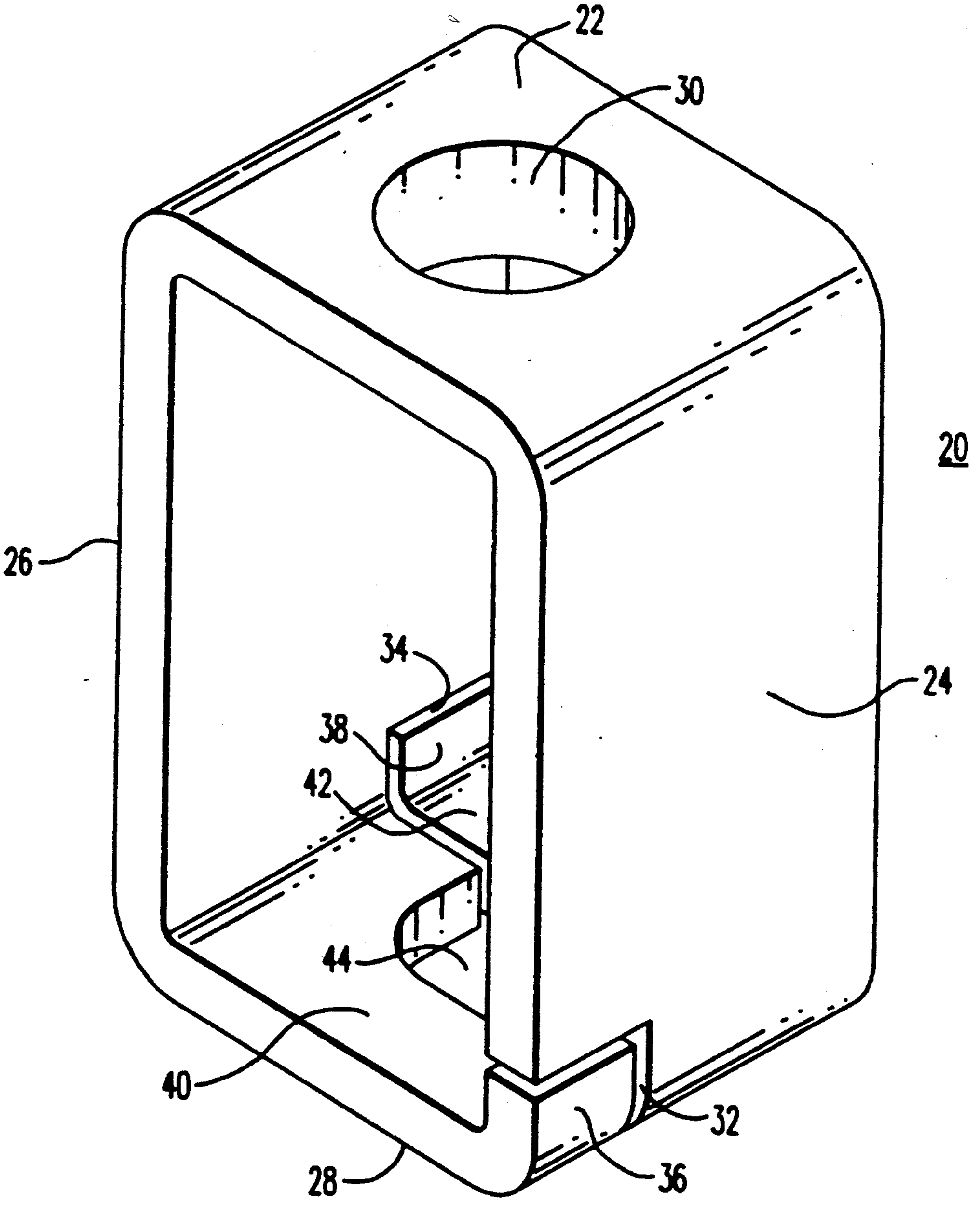
FIG. 1 shows an isometric view of the clamp assembly collar.
Figure 2:
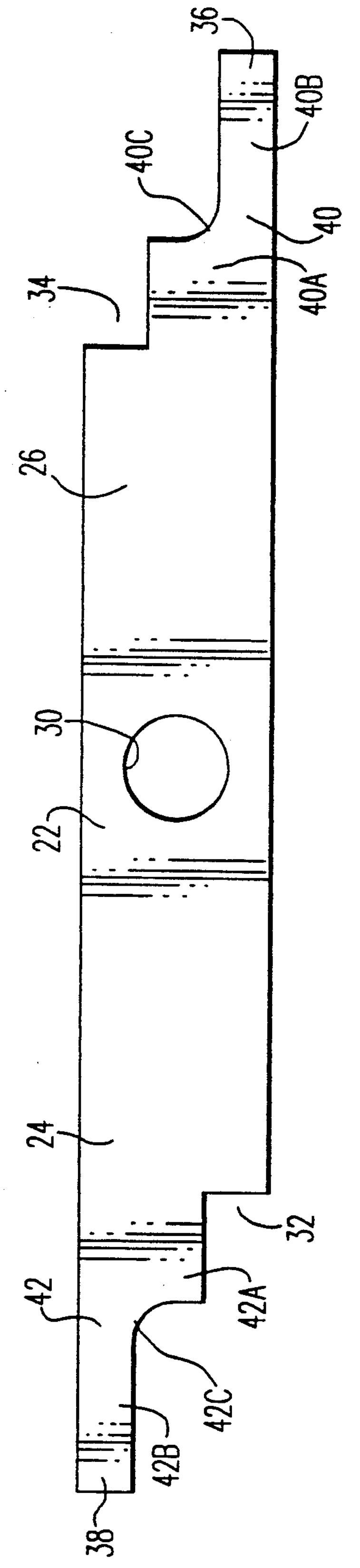
FIG. 2 shows the pre-bent top view of the clamp assembly collar of FIG. 1.
Figure 4:
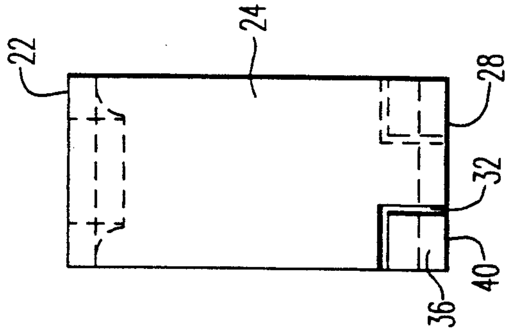
FIG. 4 shows a side elevation view of the clamp assembly collar of FIG. 1.
Figure 3:
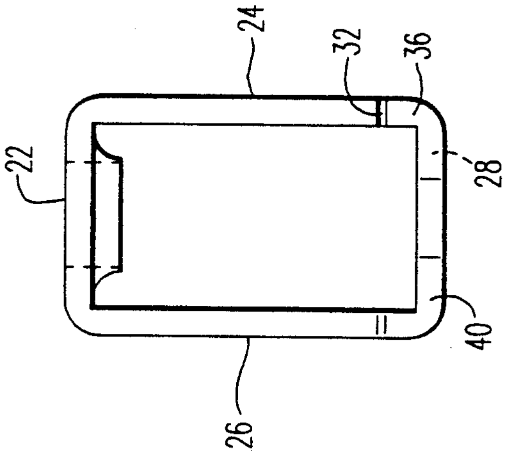
FIG. 3 shows a front elevation view of the clamp assembly collar of FIG. 1.
Figure 5:
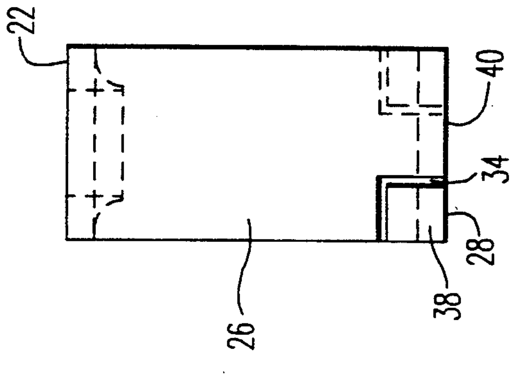
FIG. 5 shows the opposite side elevation view of the clamp assembly collar of FIG. 1.

Turning specifically to FIGS. 1 and 2, the collar side 22 is shown having disposed therein a transversely threaded aperture 30. The collar sides 24 and 26 are constructed with diagonally opposed rectangular notches 32 and 34 located at the corners where the sides 24 and 26 join the side 28. Into these rectangular notches 32 and 34 are disposed the movable finger members 36 and 38 which function to apply a gripping force transversely upon the sides of the bus conducting terminal hereinafter described. FIG. 4 clearly shows the relationship described above of the side 24, the notch 32, and the movable finger member 36. FIG. 5 clearly shows the relationship described above of the side 26, the notch 34, and the movable finger member 38.

Figure 6:
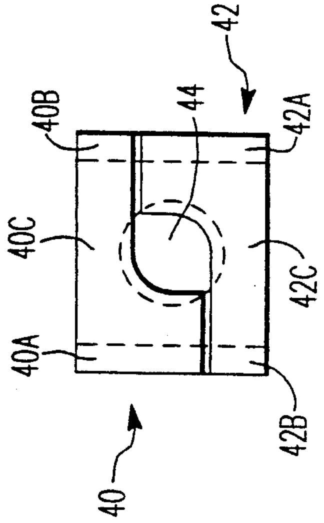
FIG. 6 shows a bottom elevation view of the clamp assembly collar of FIG. 1.

Turning to FIG. 6, the construction of the side 28 is shown. The side 28 comprises the movable finger support members, or flanges, 40 and 42 along with the centrally located aperture 44. The movable finger support member 40 comprises sections 40A and 40B with the section 40A being that portion of the movable finger support member 40 that joins to side 26 while the section 40B being that portion of the movable finger support member 40 that joins to and supports movable finger member 36. The section 40A is nearly rectangular in shape having a width defined by that portion of the side 26 to which it is attached. The width of section 40A is equal to the width of the side 26 less the width of that portion of the side 26 which has been removed to create the notch 34. The section 40B is also nearly rectangular in shape having a width defined by the width of the movable finger member 36 to which it is attached. The width of the section 40B is approximately equal to the width of the notch 32 into which the movable finger member 36 is disposed. The section 40A joins the section 40B through the transitional area 40C having a sharp curve to accommodate the transition from the wider section 40A to the narrower section 40B. The movable finger support member 42 is constructed in similar fashion with the section 42A having a width defined by the width of that portion of the side 24 to which it is attached, the section 42B having a width defined by the width of the movable finger member 38 to which it is attached, and the transitional area 42C that joins together the sections 42A and 42B. The opposing nature of the sharp curves of the transitional areas 40C and 42C combine to create the aperture 44 in the side 28.

Figure 7:
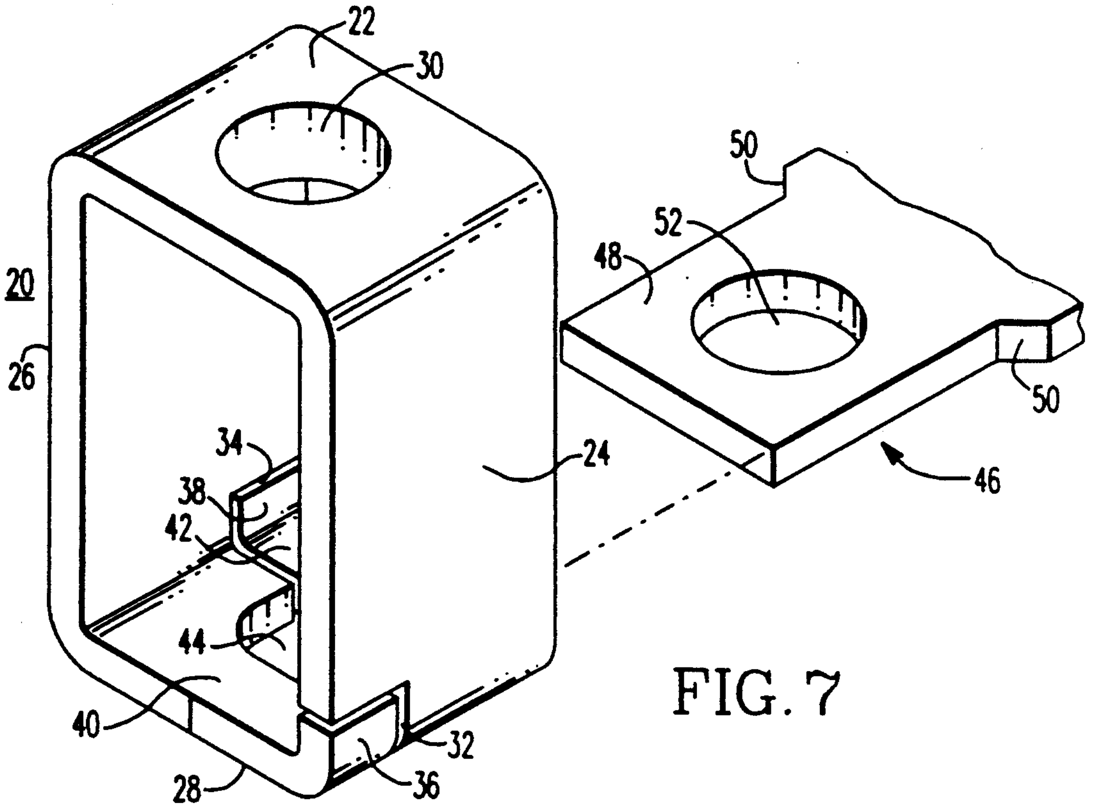
FIG. 7 shows an isometric view of the clamp assembly collar of FIG. 1 prior to disposition upon the bus conductor terminal.
Figure 8:
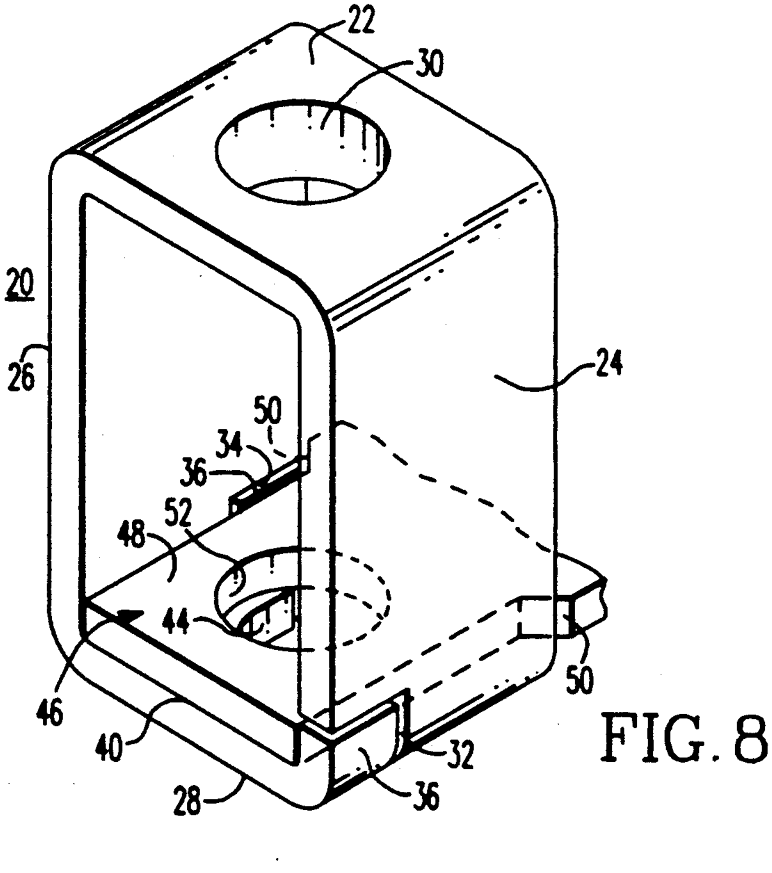
FIG. 8 shows an isometric view of the clamp assembly collar of FIG. 1 after disposition on the bus conductor terminal.

In FIG. 7 the collar 20 is shown in a state prior to disposition upon the bus conductor terminal 46 of a circuit breaker. The bus conductor terminal 46 is flat with a rectangular cross-section having an end portion 48 with a transversal dimension which matches the cross-section of the interior of the collar 20 defined between the movable finger members 36 and 38, and further has a pair of tapered laterally extending shoulders 50. When the collar 20 is inserted over the terminal 46, such that the terminal end 48 rests flatly upon side 28, the sides of the end portion 48 are substantially aligned within the interior of the collar 20 between the movable finger members 36 and 38. Moreover, the terminal end 48 possesses a central aperture 52. When the collar 20 has been fully disposed upon the terminal 46, further insertion being prevented by the flanged shoulders 50, the aperture 52 of the bus conducting terminal end 48 is aligned over the aperture 44 of the side 28. FIG. 8 shows the collar 20 fully disposed upon the bus conductor terminal 46.

Figure 9:
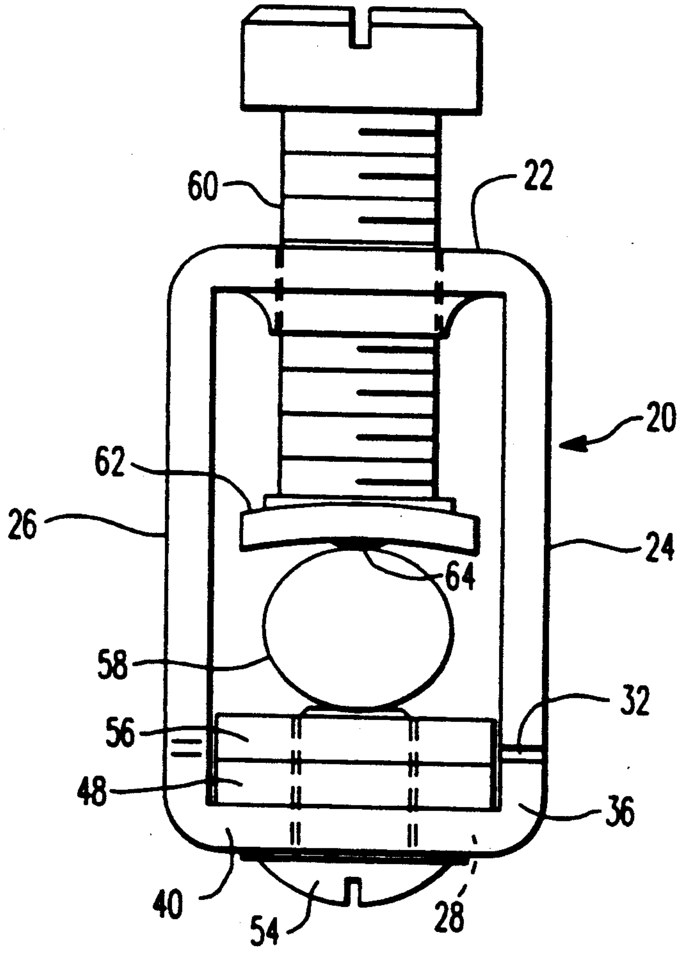
FIG. 9 shows a front elevation view of a completed connection after the collar has been disposed on the bus conductor terminal and an electric conducting cable.

Turning to FIG. 9, to anchor the terminal end 48 in place within the collar 20, an anchor screw 54 is passed through the overlapping apertures in the side 28 and the terminal end 48 and secured in place with an electrically conducting nut 56. Without the anchor screw 54, the clamp collar 20 is likely to slip free of the end portion 48 of the bus conductor terminal because of its flat rectangular shape. The anchor screw is one of the known ways to solve this slippage problem with others disclosed in U.S. Pat. No. 3,891,298 where a boss is provided upon the upper surface of a side of the collar which engages and holds the aperture of the bus conductor terminal and in U.S. Pat. No. 5,005,104 where a clip having a boss disposed thereon is in turn disposed upon the upper surface of a side of the collar which engages and holds the aperture of the bus conductor terminal, these patents being incorporated by reference herein.

Within the collar 20 and upon the nut 56 is disposed the electric cable 58. Once the cable 58 is disposed within the collar 20, a clamping force is radially applied to the cable 58 to capture the cable 58 within the collar 20. The locking screw 60, passing through the transversely threaded aperture in the side 22, is tightened to pinch the cable 58 within the collar 20 between the nut 56 and the clamping shoe 62 which is rotatably secured upon the end of the locking screw 60, although other means of providing the clamping force are acceptable. The lack of welds in the collar assembly 20 allow for an increased torque that can be applied by the locking screw 60. As a result, the locking screw 60 does not raise any problem of fastening the collar 20 to the cable 58 because of the excellent grip obtained with the locking screw 60 upon the wires of the cable 58 in this embodiment. However, to further secure the cable 58 within the collar 50, the clamping shoe 62 has an added boss 64 that engages into the cable 58 as the clamp shoe 62 presses upon the cable 58.

The present embodiment offers a further solution to the problem of slippage between the collar 20 and the bus conductor terminal end 48. As was previously discussed, the terminal end 48 is disposed within the collar 20 between the movable finger members 36 and 38. As the locking screw 60 applies the clamping force radially upon the cable 58 the movable finger members 36 and 38 close upon the terminal end 48 applying a gripping force transversely upon the sides of the conducting terminal end 48 thus further minimizing the slippage problem. More specifically, when the clamping force is applied to the cable 58 the collar 20 experiences tensile stress. This tensile stress is translated to the side 28 causing movable finger support members 40 and 42 to be pulled outward in opposing directions which in turn cause the movable finger members 36 and 38 to close inwardly upon the bus conductor terminal end 48. The opposing nature of the inward movement of the finger members 36 and 38, transversely applied upon the sides of the bus conducting terminal end 48, act to further clamp the terminal within the collar assembly 20. The tensile stress is advantageously absorbed by the movable flanges 40 and 42 of the side 28 and transferred to the finger members 36 and 38 which in turn use this stress to secure the bus terminal within the collar. In the past this tensile stress has had the disadvantage of being absorbed by the welds used to close the collar, often causing their breakage. Of course it is realized that the same results may be obtained by having a single movable finger member that is capable of pinching the bus terminal end to a fixed support. Once the clamping force applied by the locking screw 60 is removed, the collar 20 resumes its normal, stress-free disposition allowing the movable finger members 36 and 38 to assume their normal positioning thereby freeing the bus conductor terminal end 48 from the transversely applied gripping force.

Figure 10:
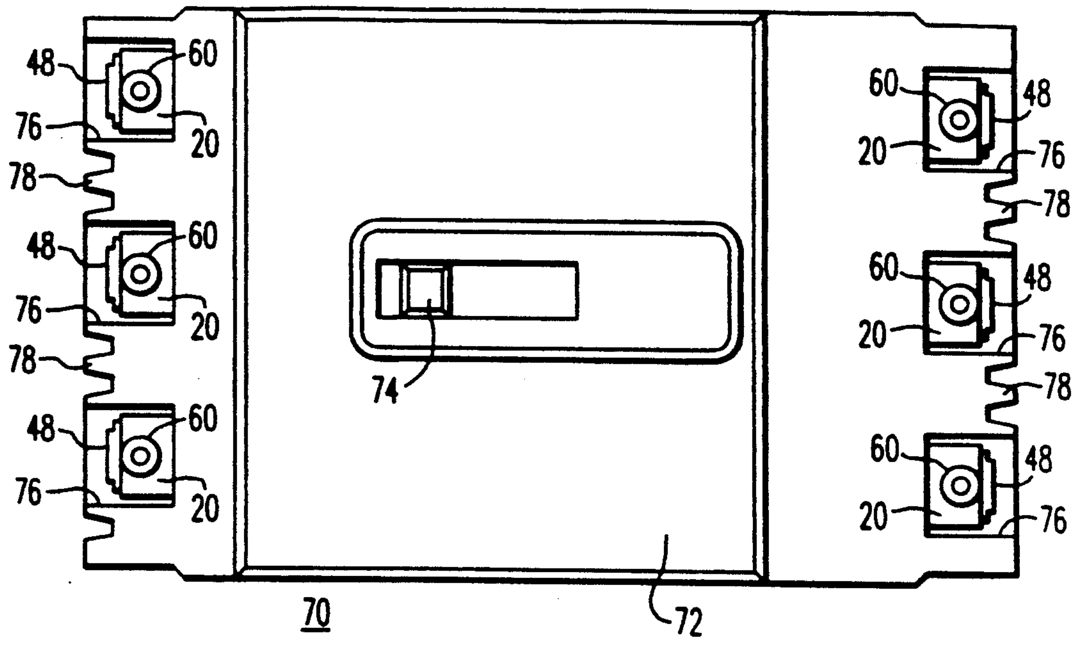
FIG. 10 is a top plan view of a molded-case type circuit breaker with clamp assemblies disposed on the terminal bus conductors of the breaker and ready for connection to electric line cables.
Figure 11:
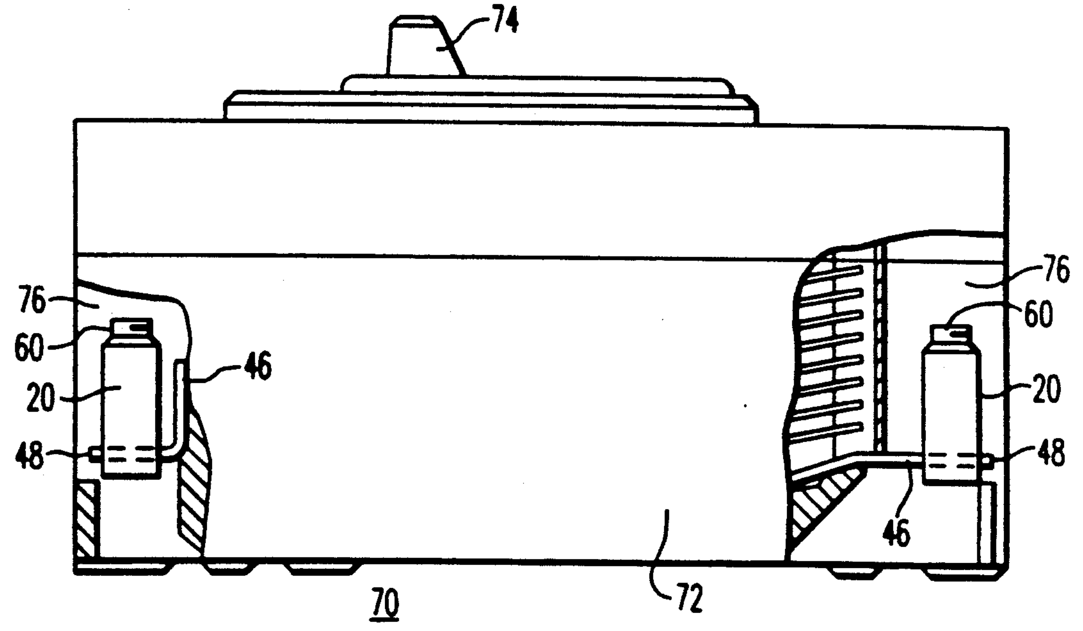
FIG. 11 is a side elevation view partially broken away of the circuit breaker of FIG. 10.

The clamp collar 20 is particularly suitable for use on a circuit breaker 70 of the molded-case type shown in FIGS. 10 and 11. For a three-phase circuit breaker 70 with connections on the line and load sides, six clamp collars 20 are required per breaker. The line cables to be connected to the circuit breaker 70 are insertable endwise into the respective collars 20 which have been previously coupled to the ends 48 of the respective bus conductors 46 that are connected to a pair of separable contacts located within the breaker housing 72, housing 72 being composed of suitable insulating material. The circuit breaker 70 is manually operated to the close and open positions by manipulating an actuating lever 74 that extends from the breaker housing 72 and the breaker is designed to be automatically tripped open in response to current overloads by the operation of an internal trip device. The details of the operating mechanism and trip device is disclosed in U.S. Pat. Nos 3,480,900 and 3,492,614 incorporated herein by reference.

As will be noted in FIGS. 10 and 11, each of the bus conductors 46 extend from the breaker housing 72 and are located within a series of small cavities or recesses 76 that are separated from each other by insulating baffles 78 and are large enough to accommodate the respective collar assemblies 20 and permit their coupling to the bus conductor end portions 48 and then be readily accessible for insertion of the line cables and for tightening of the respective lock screws 60. Suitable openings in the breaker housing 72 are provided to permit tightening of the coupling and locking screws of the terminal assemblies 20 through the use of proper tools. Entry of the line cables into the lug openings is aided by the lips of the respective bus conductor end portions 48 which protrude beyond the sides of the collars 20.

It should be apparent from the preceding description that this invention has among other advantages, the advantage of having a collar free of welds which tend to break under the mechanical stresses experienced by the collar as the clamping screw is tightened upon the overlapping cable and terminal assembly. It further has the advantage of providing a counter-force transversely upon the sides of the terminal end as the radial clamping force is applied to the electric cable. This transversal counter-force is used to counter-act the tangential forces tending to free the terminal end from the collar.

It is to be understood that the descriptions and drawings shown with respect to the present invention are not limiting and that other unitary or non-unitary clamp shapes having movable finger members positioned around a conducting terminal in order to accommodate increased clamping torque while providing a means for securing the clamp to the bus conductor terminal acting in conjunction with the clamping torque are contemplated.

I claim:

1. In combination with a circuit interrupter that has a housing of insulating material and is adapted to protect an electric circuit from current overloads, a bus conductor extending from said housing, and a collar assembly fastened to said bus conductor for facilitating the connection of said circuit interrupter to an electric cable conductor that comprises part of said circuit being protected, said collar assembly comprising:

a collar having a first leg and a second leg;

securing means associated with said collar for applying a first securing force upon the electric cable conductor for urging the electric cable conductor into electrical contact with said bus conductor and for securing the electric cable conductor within said collar; and a movable portion connected to said first leg and extending toward said second leg for moving in cooperation with said securing means as said securing means is operated to apply said first securing force for attenuating a stress said first securing force generates upon said collar.

2. The combination as recited in claim 1, wherein said collar further comprises a second movable portion connected to said second leg and extending toward said first leg.

3. The combination as recited in claim 2, wherein said first movable portion and said second movable portion are displaced between said first and second legs in a nearly parallel coplanar fashion.

4. The combination as recited in claim 3, wherein said first movable portion and said second movable portion are disposed opposite said securing means for allowing said first and second movable portions to move nearly perpendicular to the direction of said first securing force.

5. The combination as recited in claim 4, wherein said securing means comprises a locking screw.

6. In combination with a circuit interrupter that has a housing of insulating material and is adapted to protect an electric circuit from current overloads, a bus conductor extending from said housing, and a collar assembly fastened to said bus conductor for facilitating the connection of said circuit interrupter to an electric cable conductor that comprises part of said circuit being protected, said collar assembly comprising:

a collar having a first side and a second side;

securing means associated with said collar for applying a first securing force upon the electric cable conductor for urging the electric cable conductor into electrical contact with said bus conductor and for securing the electric cable conductor within said collar; and a first movable portion connected to said first side and extending toward said second side for moving in cooperation with said securing means as said securing means is operated to apply said first securing force for applying a second securing force upon said bus conductor, said second securing force being applied in a direction differently than the direction of said first securing force, for securing said bus conductor within said collar when said securing means is operated to apply said first securing force.

7. The combination as recited in claim 6, wherein said movable portion comprises a finger member.

8. The combination as recited in claim 7, wherein said finger member comprises a generally L-shaped member.

9. The combination as recited in claim 8, wherein said second securing force is generally perpendicular to the direction of said first securing force.

10. The combination as recited in claim 9 wherein said securing means comprises a locking screw.

11. The combination as recited in claim 6, wherein said collar further comprises a second movable portion connected to said second side and extending toward said first side, said first and second movable portions cooperating to produce said second securing force as said securing means is operated to apply said first securing force.

12. The combination as recited in claim 11, wherein said first and second movable portions each comprise a generally L-shaped member.

13. The combination as recited in claim 12, wherein said second securing force is generally perpendicular to the direction of said first securing force.

14. The combination as recited in claim 12, wherein said first side has disposed therein a notch before said first side attaches to said first movable portion and adjacent said bus conductor, said second side has disposed therein a notch before said second side attaches to said second movable portion and adjacent said bus conductor, said first movable portion extending from said first side to said second side allowing said L-shaped member of said first movable portion to be disposed in said notch, said second movable portion extending from said second side to said first side allowing said L-shaped member of said second movable portion to be disposed in said notch.

15. The combination as recited in claim 12, wherein said securing means comprises a locking screw.

16. An electrical conductor clamping device, comprising:

a collar having a first side and a second side;

securing means associated with said collar for applying a securing force upon an electrical conductor disposed within said collar;

a first flange connected to said first side and extending toward said second side; and a second flange connected to said second side and extending toward said first side, said first and second flanges being cooperable with respect to each other for attenuating a mechanical stress the securing force generates upon said collar.

17. The electrical conductor clamping device as recited in claim 16 wherein said first flange and said second flange are displaced between said first and second sides in a nearly parallel co-planar fashion.

18. The electrical conductor clamping device as recited in claim 17, wherein said first flange and said second flange are disposed opposite said securing means.

19. The collar as recited in claim 18, wherein said securing means comprises electrical conductor clamping device a locking screw.

20. An electrical conductor clamping device, comprising:

a collar having a first side and a second side;

securing means associated with said collar for applying a first securing force upon an electrical conductor disposed within said collar; and a movable finger member attached to said first side and extending toward said second side for applying a second securing force upon the electrical conductor disposed within said collar, said second securing force being applied in a direction differently than the direction of said first securing force.

21. The electrical conductor clamping device as recited in claim 20, wherein said finger member comprises a generally L-shaped member.

22. The electrical conductor clamping device as recited in claim 20, wherein said second securing force is generally perpendicular to the direction of said first securing force.

23. The collar as recited in claim 22, wherein said securing means comprises electrical conductor clamping device a locking screw.

24. An electrical conductor clamping device comprising:

a collar having a first side and ą second side;

securing means associated with said collar for applying a first securing force upon an electrical conductor disposed within said collar;

a first finger member attached to said first side and extending toward said second side for applying a second securing force upon the electrical conductor disposed within said collar; and a second finger member attached to said second side and extending toward said first side for cooperating with said first finger member in applying said second securing force upon the electrical conductor.

25. The electrical conductor clamping device as recited in claim 24, wherein said first finger member comprises a generally L-shaped member and said second finger member comprises a generally L-shaped member.

26. The electrical conductor clamping device as recited in claim 25, wherein said second securing force is generally perpendicular to the direction of said first securing force.

27. The electrical conductor clamping device as recited in claim 25, wherein said first side has disposed therein a notch in the vicinity of said first finger member, said second side has disposed thereiı a notch in the vicinity of said second finger member, said first finger member extending from said first side to said second side allowing said L-shaped member of said first finger member to be generally disposed in said notch of said second side, said second finger member extending from said second side to said first side allowing said L-shaped member of said second finger member to be generally disposed in said notch of said first side.

28. The collar as recited in claim 27, wherein said securing means comprises electrical conductor clamping device a locking screw.

* * * * *